UNITED STATES PATENT OFFICE.

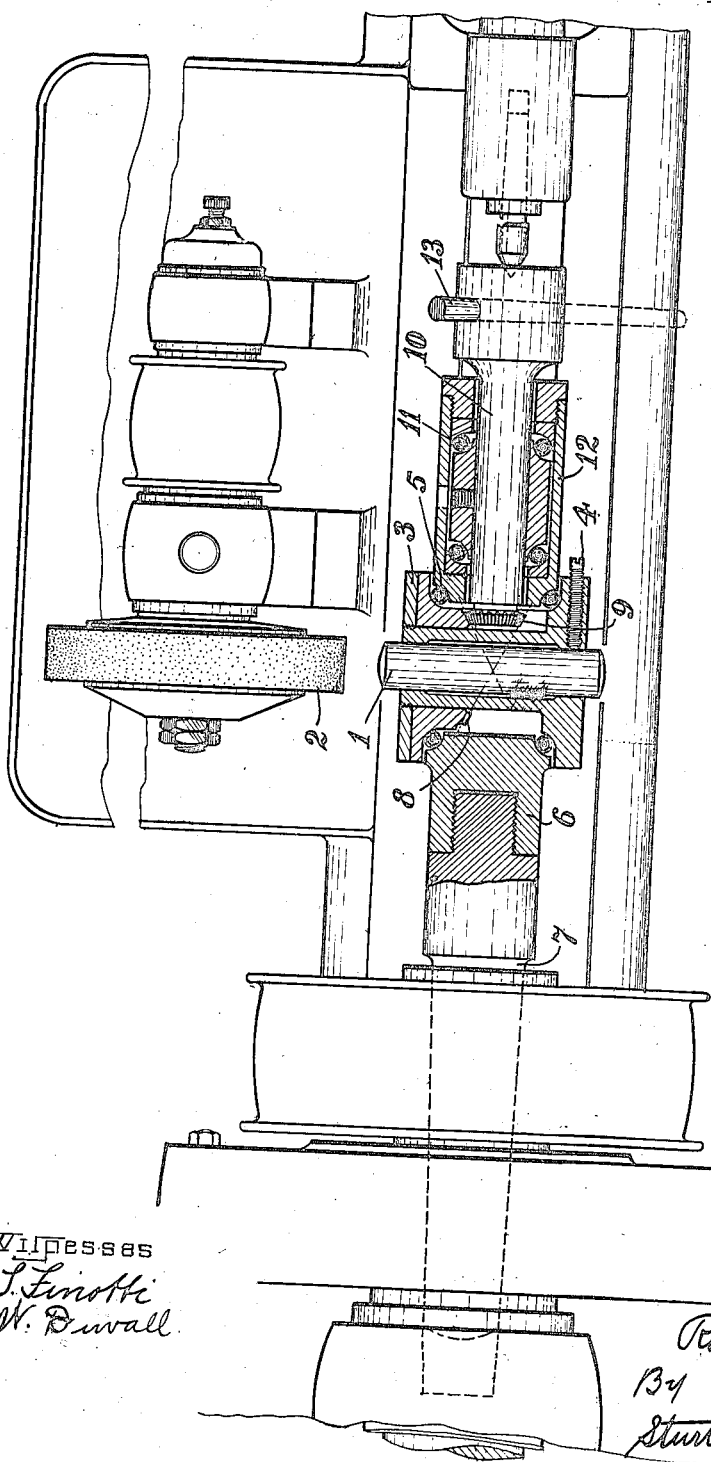

ROBERT HARMAN, OF YORK, ENGLAND, ASSIGNOR TO T. COOKE & SONS, LIMITED, OF BISHOPSHILL, YORK, ENGLAND.

WORK-HOLDER FOR GRINDING AND THE LIKE MACHINES.

1,383,941.  Specification of Letters Patent.  Patented July 5, 1921.

Application filed February 27, 1920. Serial No. 361,877.

*To all whom it may concern:*

Be it known that I, ROBERT HARMAN, a subject of the King of Great Britain, residing at York, in the county of York and Kingdom of England, have invented certain new and useful Improvements in Work-Holders for Grinding and the like Machines, of which the following is a specification.

The present invention relates to an improved work holder for the holding of articles such as gages having spherical ends which are to be ground or otherwise machined on a machine or the like tool.

The work holder of the present invention comprises a socket adapted to be connected to the head-stock of a lathe or grinding machine, for instance, by means of the usual Morse or the like taper connection, which holder is adapted to receive a gage element rotating about the axis of the tool holder by the rotation of this latter and also about its own axis.

The invention is more particularly described with reference to the accompanying drawings showing one form of construction in sectional elevation.

A bar gage such as 1, the ends of which are to be ground to cylindrical shape by means of an emery wheel 2, or the like is adapted to be locked within a sleeve holder 3, by means of a set screw 4. This sleeve 3, is mounted by means of a pair of antifriction bearings 5, in a body 6, connected with a spindle 7, by which it can be locked to the rotating head stock spindle of a lathe or grinding machine.

The sleeve 3, is provided with an internal bevel ring 8, engaging with a crown wheel 9, on a shaft 10, supported by means of a ball bearing 11, in a body or sleeve 12, forming a portion of the body 6. The shaft 10 can be supported on the tail stock of the lathe against rotation for instance by a dog, passing through a perforation 13, in the end of this.

It will be seen therefore that as the spindle 7, rotates while the shaft 10 is stationary, the work will not only be rotating about its own axis but will also rotate about an axis at right angles thereto, namely, about the axis of the spindle 7, consequently the ends of the work will be ground to a spherical form of a radius equal to the distance of the emery wheel from the axis of rotation of the holder.

I declare that what I claim is:—

1. As an article of manufacture, a holder for a piece of work, means to secure the work in said holder, with both ends permanently exposed for operation, a spindle carrying said holder, means to continuously rotate said spindle, and means to continuously rotate said holder in said spindle about an axis at right angles to the axis of rotation of the spindle.

2. As an article of manufacture, a grinding machine comprising a headstock, a tailstock, a rotating spindle, in said headstock, a shaft, means to rigidly connect said shaft to said tailstock, bearings for said spindle on the shaft, a work holder, means to secure an article in said holder, bearings for said holder on said spindle, gearing between said holder and said shaft whereby the holder is rotated continuously about an axis at right angles to the axis of the spindle.

In witness whereof, I have hereunto signed my name this 11th day of February, 1920, in the presence of two subscribing witnesses.

ROBERT HARMAN.

Witnesses:
RONALD H. LESTER,
CALEB G. CRESSWELL.